United States Patent
Kim et al.

(10) Patent No.: US 7,667,784 B2
(45) Date of Patent: Feb. 23, 2010

(54) LIQUID CRYSTAL DISPLAY DEVICE WITH LIGHT BLOCK PATTERN AND METHOD OF FABRICATING THE SAME

(75) Inventors: Woong-Kwon Kim, Gyeonggi-do (KR); Seung-Ryul Park, Incheon (KR)

(73) Assignee: LG Display Co., Ltd.

( * ) Notice: Subject to any disclaimer, the term of this patent is extended or adjusted under 35 U.S.C. 154(b) by 0 days.

(21) Appl. No.: 10/323,877

(22) Filed: Dec. 20, 2002

(65) Prior Publication Data

US 2003/0123017 A1    Jul. 3, 2003

(30) Foreign Application Priority Data

Dec. 29, 2001    (KR) .................... 10-2001-0087757

(51) Int. Cl.
G02F 1/136    (2006.01)
G02F 1/1335   (2006.01)
H01L 29/04    (2006.01)
G09G 3/36     (2006.01)

(52) U.S. Cl. .............................. 349/44; 349/42; 349/43; 349/96; 349/110; 349/111; 257/59; 257/72; 345/92

(58) Field of Classification Search ................ 349/153, 349/190, 42–44, 110–111, 96; 257/59, 72; 345/92

See application file for complete search history.

(56) References Cited

U.S. PATENT DOCUMENTS

| | | | | |
|---|---|---|---|---|
| 5,818,550 | A * | 10/1998 | Kadota et al. | 349/43 |
| 5,835,179 | A * | 11/1998 | Yamanaka | 349/161 |
| 5,854,663 | A * | 12/1998 | Oh et al. | 349/42 |
| 6,038,003 | A * | 3/2000 | Kim | 349/43 |
| 6,038,008 | A * | 3/2000 | Kim et al. | 349/138 |
| 6,118,509 | A * | 9/2000 | Miyake | 349/153 |
| 6,337,727 | B1 * | 1/2002 | Ono et al. | 349/153 |
| 6,547,616 | B1 * | 4/2003 | Furukawa et al. | 445/24 |
| 6,580,474 | B1 * | 6/2003 | Ahn et al. | 349/43 |
| 7,041,522 | B2 * | 5/2006 | Tanaka et al. | 438/30 |
| 2001/0019381 | A1 * | 9/2001 | Ma et al. | 349/96 |
| 2005/0151899 | A1 * | 7/2005 | Chou et al. | 349/110 |

FOREIGN PATENT DOCUMENTS

| | | |
|---|---|---|
| JP | 61-140095 | 12/1985 |
| JP | 63-123020 | 11/1986 |
| JP | 63-045534 | 3/1988 |
| JP | 64-45822 | 3/1989 |
| JP | 1-162328 | 11/1989 |
| JP | 05-005872 | * 1/1993 |
| JP | 05-281535 | 10/1993 |
| JP | 05-281535 | 1/1995 |
| JP | 08-122824 | 5/1996 |
| JP | 09-244015 | 9/1997 |
| JP | 2001-183679 | 7/2001 |
| JP | 2001-318373 | 11/2001 |
| KR | 10-0220854 | 6/1999 |

* cited by examiner

*Primary Examiner*—Hoan C Nguyen
(74) *Attorney, Agent, or Firm*—McKenna Long & Aldridge

(57) ABSTRACT

A liquid crystal display device includes first and second substrates facing each other with a predetermined space therebetween, a liquid crystal material layer disposed between the first and second substrates, a seal pattern formed between the first and second substrates to surround the liquid crystal material layer, and a blocking layer formed over a first surface of the second substrate to cover the seal pattern.

16 Claims, 6 Drawing Sheets

LIQUID CRYSTAL DISPLAY DEVICE WITH LIGHT BLOCK PATTERN AND METHOD OF FABRICATING THE SAME

The present invention claims the benefit of Korean Patent Application No. 2001-87757 filed in Korea on Dec. 29, 2001, which is hereby incorporated by reference.

BACKGROUND OF THE INVENTION

1. Field of the Invention

The present invention relates to a liquid crystal display device and a method of fabricating the same, and more particularly, to a liquid crystal display device having a high aperture ratio and a method of fabricating the same.

2. Discussion of the Related Art

Many efforts are being made to study and develop liquid crystal display (LCD) devices because of their high resolution images, light weight, small thickness, compact size, low power supply requirements, and lesser power consumption.

In general, a LCD device uses an optical anisotropy of liquid crystal materials, and controls light transmissivity through the device by applying an electric field, thereby varying an arrangement of liquid crystal molecules within a liquid crystal material layer to produce an image. A LCD device generally includes upper and lower substrates, which are spaced apart and face each other, and a liquid crystal material layer interposed between the upper and lower substrates. Each of the substrates includes an electrode, where the electrodes face each other. In addition, the LCD device includes thin film transistors and pixel electrodes arranged in a matrix and such a LCD device is generally referred to as an active matrix liquid crystal display (AMLCD) device.

FIG. 1 is a cross-sectional view of a liquid crystal display device according to the related art. In FIG. 1, a LCD device 10 includes first and second substrates 12 and 14 facing each other with a predetermined space therebetween. A liquid crystal material layer 16 is interposed between the first and second substrates 12 and 14. The LCD device 10 has an image area A and a non-image area B surrounding the image area A, where images are displayed within the image area A.

In the image area A, a gate electrode 18 is formed on an inner surface of the first substrate 12. A gate insulating layer 20 is formed on the gate electrode 18, and the gate insulating layer 20 extends to the non-image area B. An active layer 22 is formed on the gate insulating layer 20 and is disposed over the gate electrode 18. In addition, a data line 25 and source and drain electrodes 24 and 26 are formed on the active layer 22. The gate electrode 18, the active layer 22, and the source and drain electrodes 24 and 26 form a thin film transistor T. A data pad 27 is formed on the gate insulating layer 20 in the non-image area B to connect the data line 25 to outer circuits (not shown).

Furthermore, a passivation layer 28 is formed on the data line 25, the source and drain electrodes 24 and 26, and the data pad 27. The passivation layer 28 has a drain contact hole 29 and a data pad contact hole 30 exposing the drain electrode 26 and the data pad 27, respectively. Moreover, a pixel electrode 32 and a data pad terminal 33 are formed on the passivation layer 28. The pixel electrode 32 is located in a pixel region P of the image area A and connected to the drain electrode 26 through the drain contact hole 29. The data pad terminal 33 is situated in the non-image area B and is connected to the data pad 27 through the data pad contact hole 30.

In addition, a black matrix 34 is formed on an inner surface of the second substrate 14, which is smaller than the first substrate 12. The black matrix 34 corresponds to the thin film transistor T in the image area A, and is disposed in the non-image area B. Furthermore, a color filter layer 36 is formed on the black matrix 34, and has three sub-filters of red (R), green (G), and blue (B) disposed in the pixel region P. An overcoat layer 38 is formed on the color filter layer 36, and a common electrode 40 is formed on the overcoat layer 38.

Moreover, first and second alignment layers (not shown) are formed on the pixel electrode 32 and the common electrode 40, respectively, to arrange liquid crystal molecules of the liquid crystal material layer 16. Then, a spacer 42 is formed in the liquid crystal material layer 16 to maintain a uniform cell gap forming a uniform thickness of the liquid crystal material layer 16.

A seal pattern 44 is formed in the non-image area B between the first and second substrates 12 and 14 to prevent the liquid crystal material of the liquid crystal material layer 16 from leaking. In addition, first and second polarizers 31 and 35 are arranged over outer surfaces of the first and second substrates 12 and 14, respectively. Further, a back light unit (not shown) is located over the first polarizer 31 as a light source. Accordingly, the black matrix 34 covers the seal pattern 44, such that the black matrix 34 blocks light L1 around the seal pattern 44 from the back light unit, and prevents light leakage in the non-image area B. However, the black matrix 34 decreases an aperture ratio of the LCD device, thereby reducing the image area A. Moreover, since the black matrix 34 should have a margin in order to prevent misalign of the first and second substrates 12 and 14, thereby increasing the non-image area B.

Recently, a high aperture ratio LCD device has been proposed. In the high aperture ratio LCD device, gate and data lines are used as a black matrix by forming a passivation layer with a low dielectric material and overlapping a pixel electrode with the gate and data lines.

In addition, a LCD device having a thin film transistor on color filter (TOC) or color filter on thin film transistor (COT) structure, which includes a color filter layer and a thin film transistor on one substrate, has also been proposed. In the LCD device having the TOC or COT structure, a black matrix is formed on the substrate that includes the color filter layer and the thin film transistor, such that the black matrix corresponds to the thin film transistor and does not require a black matrix margin.

However, in the aforementioned high aperture ratio LCD device and the LCD device having the TOC or COT structure, the black matrix does not cover a seal pattern in the non-image area. Thus, in these LCD devices, light leakage occurs in the non-image area, thereby reducing light usage efficiency of the devices.

SUMMARY OF THE INVENTION

Accordingly, the present invention is directed to a liquid crystal display device and a method of fabricating the same that substantially obviates one or more problems due to limitations and disadvantages of the related art.

An object of the present invention is to provide a liquid crystal display device that has a high aperture ratio and prevents light leakage along an edge of an image area.

Another object of the present invention is to provide a method of fabricating a liquid crystal display device that has a high aperture ratio and prevents light leakage along an edge of an image area.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes first and second substrates facing each other with a predetermined space therebetween, a liquid crystal material layer disposed between the first and second substrates, a seal pattern formed between the first and second substrates to surround the liquid crystal material layer, and a blocking layer formed over a first surface of the second substrate to cover the seal pattern.

In another aspect, a liquid crystal display device includes a first substrate having a pixel region, a thin film transistor formed on a first surface of the first substrate, a passivation layer formed on the thin film transistor, a black matrix formed on the passivation layer covering the thin film transistor, a pixel electrode formed within in the pixel region over the passivation layer and electrically connected to the thin film transistor, a second substrate facing the first surface of the first substrate with a predetermined space therebetween, a color filter layer formed on a first surface of the second substrate, a common electrode formed on the color filter layer, a liquid crystal material layer disposed between the first and second substrates, a seal pattern between the first and second substrates to surround the liquid crystal material layer, and a blocking layer formed on a second surface of the second substrate to cover the seal pattern.

In another aspect, a liquid crystal display device includes a first substrate, a color filter layer formed on a first surface of the first substrate, a planarization layer formed on the color filter layer, a thin film transistor formed on the planarization layer, a black matrix covering the thin film transistor, a pixel electrode connected to the thin film transistor, a second substrate facing the first surface of the first substrate with a predetermined space therebetween, a common electrode formed on a first surface of the second substrate, a liquid crystal material layer disposed between the first and second substrates, a seal pattern formed between the first and second substrates to surround the liquid crystal material layer, and a blocking layer on a second surface of the second substrate to cover the seal pattern.

In another aspect, a liquid crystal display device includes a first substrate having a pixel region, a thin film transistor formed on a first surface of the first substrate, a color filter layer formed over the thin film transistor within the pixel region, a black matrix covering the thin film transistor, a planarization layer formed over the color filter layer and the black matrix, a pixel electrode formed on the planarization layer, the pixel electrode corresponding to the color filter layer and connected to the thin film transistor, a second substrate facing the first surface of the first substrate with a predetermined space therebetween, a common electrode formed on a first surface of the second substrate, a liquid crystal material layer disposed between the first and second substrates, a seal pattern formed between the first and second substrates to surround the liquid crystal material layer, and a blocking layer formed on a second surface of the second substrate to cover the seal pattern.

In another aspect, a method of fabricating a liquid crystal display device includes forming a thin film transistor on a first substrate, forming a pixel electrode connected to the thin film transistor on the first substrate, forming a seal pattern on the first substrate to surround the thin film transistor and the pixel electrode, forming a common electrode on a first surface of a second substrate, attaching the first and second substrates such that the common electrode faces the pixel electrode, injecting a liquid crystal material into a space within the seal pattern between the pixel electrode and the common electrode, and forming a blocking layer on a second surface of the second substrate to cover the seal pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
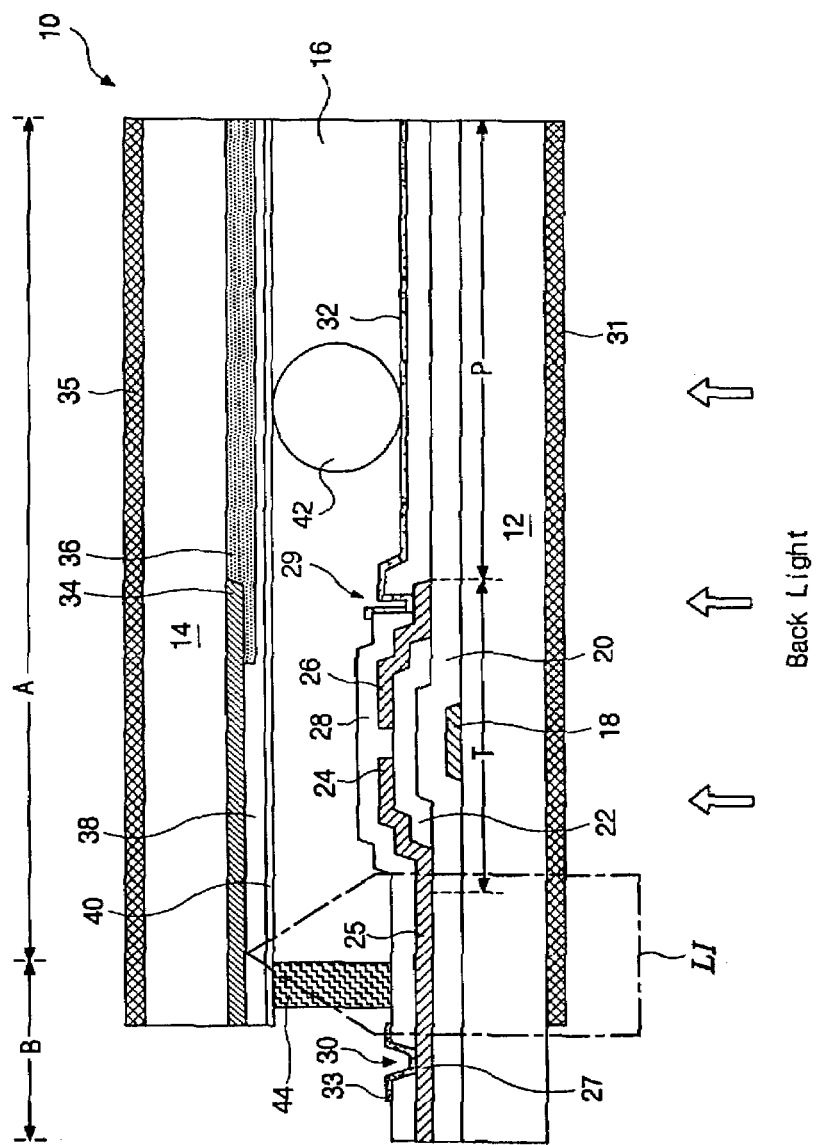
FIG. 1 is a cross-sectional view of a liquid crystal display device according to the related art.
Figure 2:
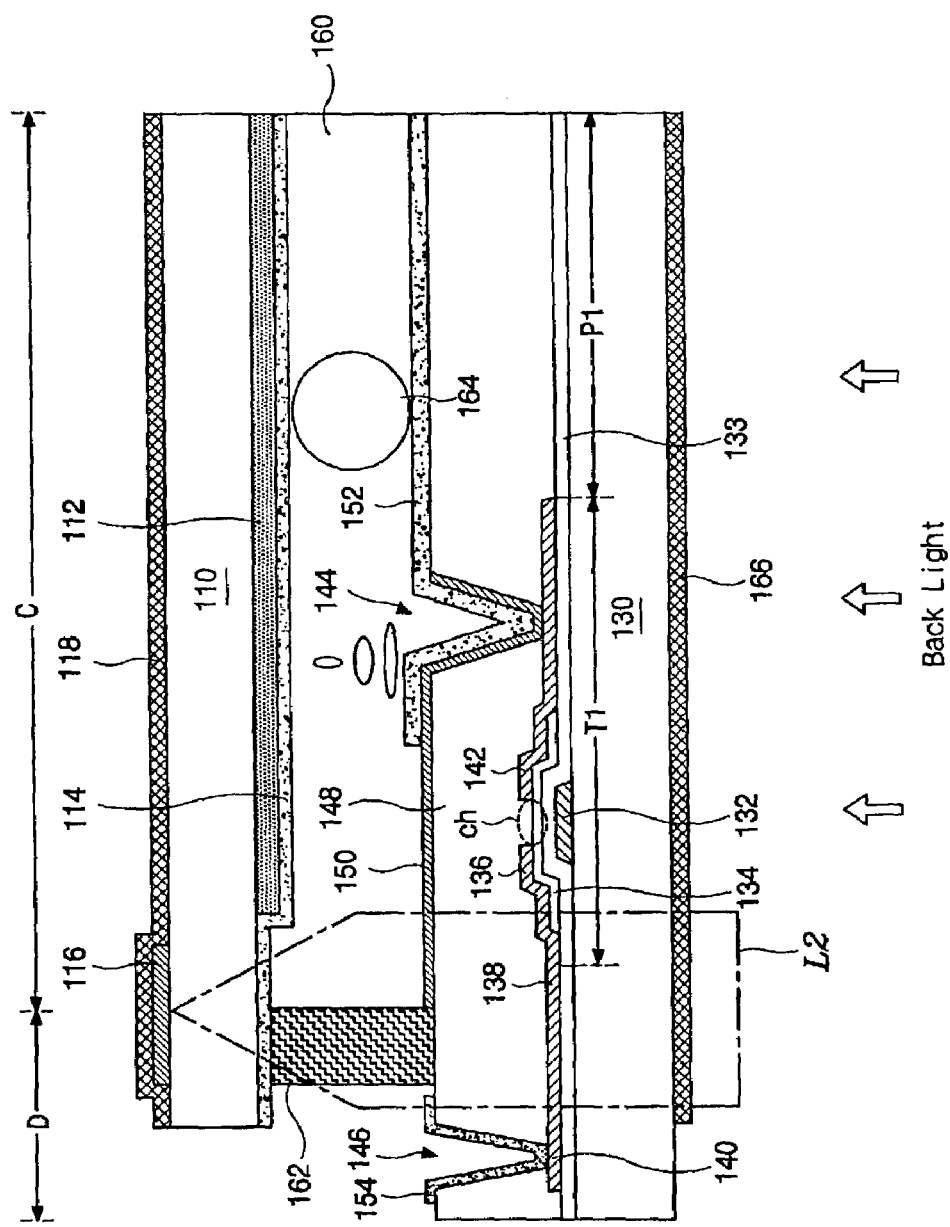
FIG. 2 is a cross-sectional view of an exemplary liquid crystal display device according to the present invention.

FIG. 2 is a cross-sectional view of an exemplary liquid crystal display device according to the present invention. In FIG. 2, a LCD device may include first and second substrates 130 and 110 facing each other with a predetermined space therebetween. A liquid crystal material layer 160 may be interposed between the first and second substrates 130 and 110. The LCD device may have an image area C in which images are to be displayed, and a non-image area D around the image area C.

A gate electrode 132 may be formed within the image area C on an inner surface of the first substrate 130. In addition, a gate insulating layer 133 may be formed on the gate electrode 132, and the gate insulating layer 133 may extend into the non-image area D. An active layer 134 may be formed on the gate insulating layer 133 over the gate electrode 132. In addition, a data line 138 and source and drain electrodes 136 and 142 may be formed on the active layer 134. An ohmic contact layer (not shown) may be formed between the active layer 134 and the source and drain electrodes 136 and 142 to lower a contact resistance between the active layer 134 and the source and drain electrodes 136 and 142. Furthermore, a data pad 140 may be formed on the gate insulating layer 133 within the non-image area D to connect the data line 138 to outer circuits (not shown). The gate electrode 132, the active layer 134, and the source and drain electrodes 136 and 142 may form a thin film transistor T1. Moreover, the active layer 134 may become a channel "ch" of the thin film transistor T1.

Although not shown in FIG. 2, a gate line and a gate pad may be formed on the first substrate 130, such that the gate line may be formed within the image area C and connected to the gate electrode 132. The gate pad may be formed within in the non-image area D, and may connect the gate line to outer circuits (not shown). The gate line and the gate pad may be formed of the same material as the gate electrode 132.

In addition, a passivation layer 148 may be formed on the data line 138, the source and drain electrodes 136 and 142, and the data pad 140. The passivation layer 148 may include a drain contact hole 144 and a data pad contact hole 146 exposing the drain electrode 142 and the data pad 140, respectively. The passivation layer 148 may have a relatively low dielectric constant about less than four, for example, and may be made of benzocyclobutene (BCB).

Furthermore, a black matrix 150 may be formed on the passivation layer 148 over the thin film transistor T1. The black matrix 150 may be made of an opaque conductive material, such as chromium (Cr). The black matrix 150 may also be connected to the drain electrode 142 through the drain contact hole 144.

A pixel electrode 152 may be formed on the black matrix 150 within the image area C to be electrically connected to the drain electrode 142. Further, the pixel electrode 152 may be formed to overlap the gate line and the data line 138, such that the gate line and the data line 138 also function as a black matrix. In addition, a data pad terminal 154 may be formed on the passivation layer 148 within the non-image area D, and the data pad terminal 154 may connect to the data pad 140 through the data pad contact hole 146. The data pad terminal 154 may be made of the same material as the pixel electrode 152.

Moreover, a color filter layer 112 may be formed on an inner surface of the second substrate 110, which has a smaller size than the first substrate 130. The color filter layer 112 may have three sub-filters of red (R), green (G), and blue (B) corresponding to a pixel region P1. A common electrode 114 may be formed on the color filter layer 112, and may extend into the non-image area D to form a electrical connection over the first substrate 130 using silver (Ag) dots.

First and second alignment layers (not shown) may be additionally formed on the pixel electrode 152 and the common electrode 114, respectively, to arrange liquid crystal molecules of the liquid crystal material layer 160. Also, a spacer 164 may be formed in the liquid crystal material layer 160 to maintain a uniform cell gap and form a uniform thickness of the liquid crystal material layer 160. In addition, a seal pattern 162 may be formed within the non-image area D between the first and second substrates 130 and 110 to prevent the liquid crystal material of the liquid crystal material layer 160 from leaking.

A first polarizer 166 may be arranged on an outer surface of the first substrate 130, and a second polarizer 118 may be arranged on an outer surface of the second substrates 110. The second polarizer 118 may have a light transmissive axis perpendicular to that of the first polarizer 166. In addition, a blocking layer 116 may be formed between the second substrate 110 and the second polarizer 118. The blocking layer 116 may be disposed within a border region between the image area C and the non-image area D covering the seal pattern 162. Furthermore, a back light unit (not shown) may be located over the first polarizer 166 to function as a light source. Accordingly, the LCD device may have a high aperture ratio since the black matrix 150 may be formed only within the region corresponding to the thin film transistor T1. In addition, light leakage may be prevented along an edge of the image area C since the blocking layer 116 may cover the seal pattern 162, thereby blocking L2 around the seal pattern 162.

Figure 3:
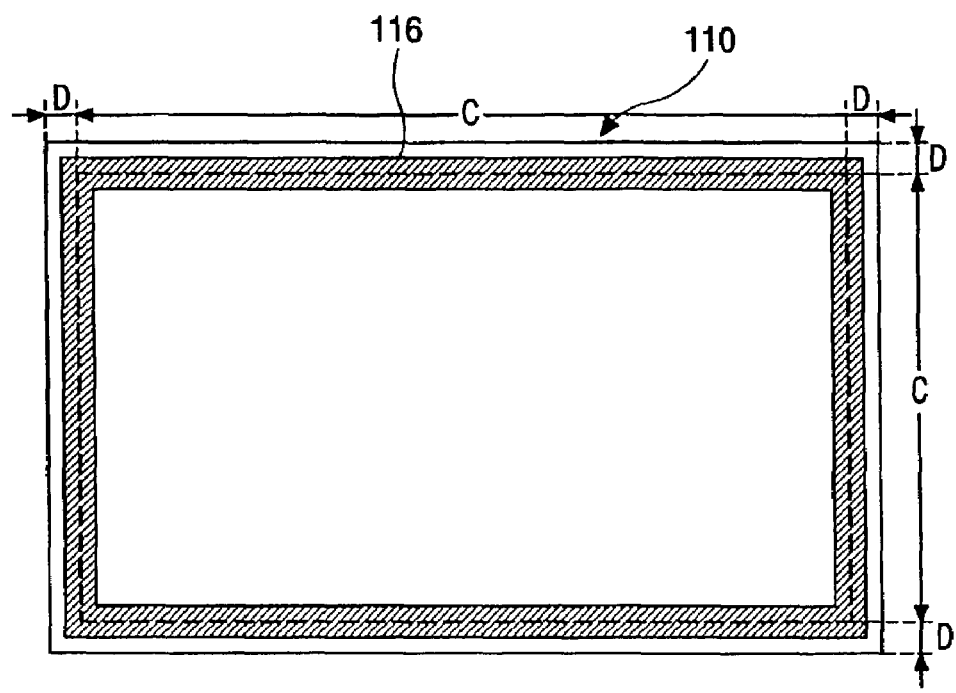
FIG. 3 is a plan view of the substrate including an exemplary blocking layer of the liquid crystal display device of FIG. 2.

FIG. 3 is a plan view of the substrate including an exemplary blocking layer of the liquid crystal display device of FIG. 2. As shown in FIG. 3, the blocking layer 116 may be formed covering a border area between the image area C and the non-image area D covering the seal pattern 162. The blocking layer 116 may be formed by a printing method or by an attaching method using an adhesive material. For example, the blocking layer 116 may be made of the same material as the black matrix 15 or a material having an optical density over about three. In addition, the blocking layer 116 may be formed after attaching the first and second substrates 130 and 110 including the thin film transistor T1, the pixel electrode 152, and the common electrode 114 on the inner surfaces thereof. Furthermore, the spacer 164 may be formed over the inner surface of the first substrate 130 before the attaching the first and second substrates 130 and 110. The blocking layer 116 may be formed on the second polarizer 118, and may be formed in the same layer with the second polarizer 118.

Figure 4A:
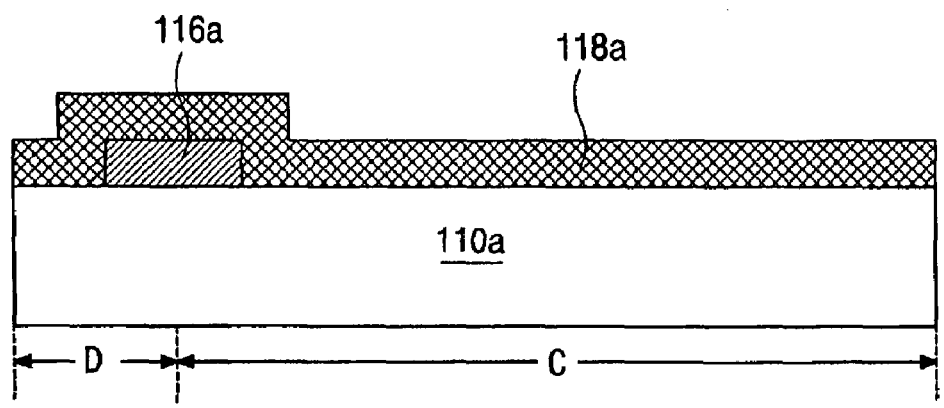
FIGS. 4A to 4C are cross-sectional views of an exemplary fabrication process for forming blocking layer according to the present invention.
Figure 4B:
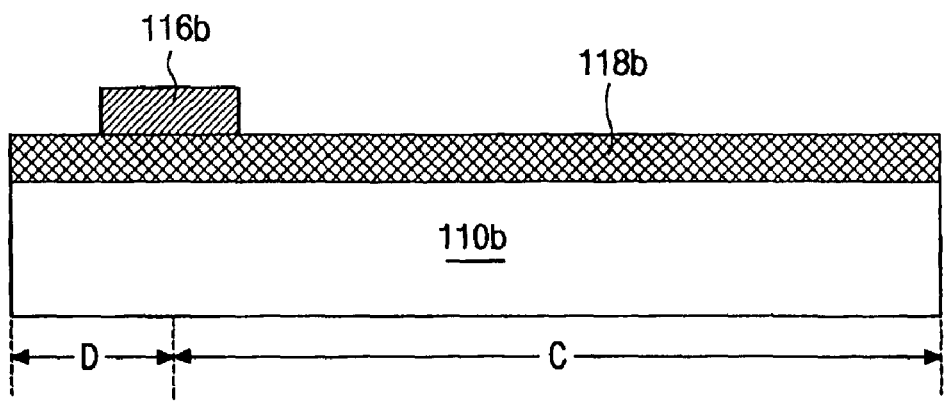
Figure 4C:
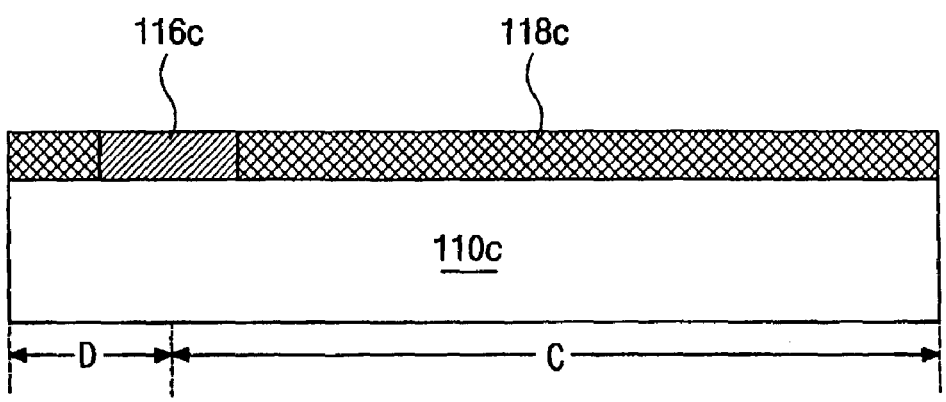

FIGS. 4A to 4C are cross-sectional views of an exemplary fabrication process for forming blocking layer according to the present invention. In FIG. 4A, a blocking layer 116a may be disposed on a substrate 110a, and a polarizer 118a may be arranged on the blocking layer 116a. The blocking layer 116a may be formed by a printing method or by an attaching method. In addition, the blocking layer 116a may be formed either on the substrate 110a or on an inner surface of the polarizer 118a. Accordingly, the blocking layer 116a may be disposed within a border area between the image area C and the non-image area D covering the seal pattern 162, as shown in FIG. 2.

In FIG. 4B, a polarizer 118b may be arranged on a substrate 110b, and a blocking layer 116b may be formed on the polarizer 118b by a printing method or an attaching method. Accordingly, the blocking layer 116b may be disposed within a border area between the image area C and the non-image area D covering the seal pattern 162, as shown in FIG. 2.

In FIG. 4C, a polarizer 118c arranged on a substrate 110c may have a blocking layer 116c covering a spacer (not shown) therein. The blocking layer 116c may be formed by arranging the polarizer 118c on the substrate 110c and changing optical properties of a portion of the polarizer 118c, or by inserting a blocking pattern in the portion of the polarizer 118c. Accordingly, the blocking layer 116c may be disposed within a border area between the image area C and the non-image area D covering the seal pattern 162, as shown in FIG. 2.

Figure 5:
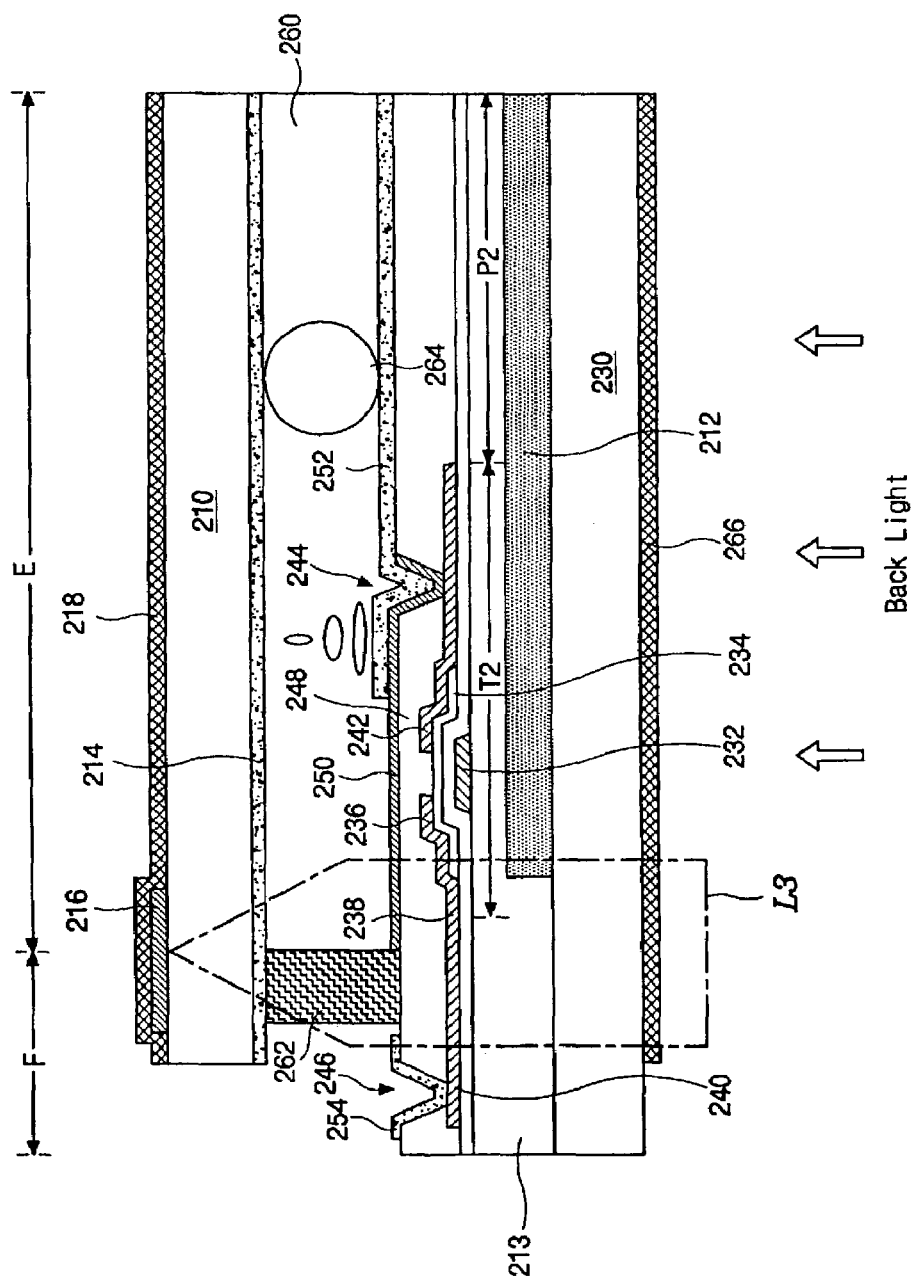
FIG. 5 is a cross-sectional view of another exemplary liquid crystal display device according to the present invention.

FIG. 5 is a cross-sectional view of another exemplary liquid crystal display device according to the present invention. In FIG. 5, a LCD device may include first and second substrates 230 and 210 facing each other with a predetermined space therebetween. A liquid crystal material layer 260 may be interposed between the first and second substrates 230 and 210. The LCD device may have an image area E in which images are to be displayed and a non-image area F around the image area E.

A color filter layer 212 may be formed on an inner surface of the first substrate 230 in the image area E. A planarization layer 213 may also be formed on the color filer layer 212, and may flatten the inner surface of the first substrate 230 including the color filter layer 212. A thin film transistor T2, which may include a gate electrode 232, an active layer 234, and source and drain electrodes 236 and 242, may be formed on the planarization layer 213 within the image area E. A data line 238 and a data pad 240, which may be made of the source and drain electrodes 236 and 242, may formed over the planarization layer 213. In addition, the data line 238 may be connected to the source electrode 236 and the data pad 240, and the data pad 240 may be disposed within the non-image area F. The data pad 240 may connect the data line 238 to outer circuits (not shown). Furthermore, a gate line (not shown) and a gate pad (not shown) made of the same material as the gate electrode 232 may additionally be formed on the planarization layer 213.

A passivation layer 248 may be formed on the thin film transistor T2, the data line 238, and the data pad 240. The passivation layer 248 may have a drain contact hole 244 and a data pad contact hole 246 exposing the drain electrode 242 and the data pad 240, respectively. The passivation layer 248 may be made of benzocyclobutene (BCB) having a relatively low dielectric constant of about less than four.

A black matrix 250 may be formed on the passivation layer 248. The black matrix 250 may cover the thin film transistor T2, and may be connected to the drain electrode 242 through the drain contact hole 244. The black matrix 150 may be made of an opaque conductive material, such as chromium (Cr).

A pixel electrode 252 may be formed on the black matrix 250 within a pixel region P2 of the image area E. The pixel electrode 252 may be connected to the black matrix 250, such that the pixel electrode 252 may be electrically connected to the drain electrode 242. A data pad terminal 254 made of the same material as the pixel electrode 252 may be formed on the passivation layer 248 within the non-image area F. The data pad terminal 254 may be connected to the data pad 240 through the data pad contact hole 246.

In addition, a common electrode 214 may be formed on an inner surface of the second substrate 210, and may extend into the non-image area F to form an electrical connection over the first substrate 230 using silver (Ag) dots. First and second alignment layers (not shown) may be formed on the pixel electrode 252 and the common electrode 214, respectively, to arrange liquid crystal molecules of the liquid crystal material layer 260. A spacer 264 may be formed in the liquid crystal material layer 260 to maintain a uniform cell gap and form a uniform thickness of the liquid crystal material layer 260. A seal pattern 262 may also be formed within the non-image area F between the first and second substrates 230 and 210 to prevent the liquid crystal material of the liquid crystal material layer 260 from leaking.

Furthermore, a first polarizer 266 may be arranged on an outer surface of the first substrate 230, and a second polarizer 218 may be arranged on an outer surface of the second substrates 210. The second polarizer 218 may have a light transmissive axis perpendicular to that of the first polarizer 266.

Moreover, a blocking layer 216 may be formed between the second substrate 210 and the second polarizer 218, and may be disposed within a border region between the image area E and the non-image area F, such that the blocking layer 216 covers the seal pattern 262. The blocking layer 216 may be formed by a printing method or by an attaching method using an adhesive material. A back light unit (not shown) may be located over the first polarizer 266 to function as a light source. Accordingly, the LCD device may have a high aperture ratio. Further, the black matrix 250 may be formed on the first substrate 230 and may have no margin, since the color filter layer 212 may be formed on the inner surface of the first substrate 230. In addition, light leakage does not occur along an edge of the image area E, since the blocking layer 216 may cover the seal pattern 262, thereby blocking light L3 around the seal pattern 262.

Figure 6:
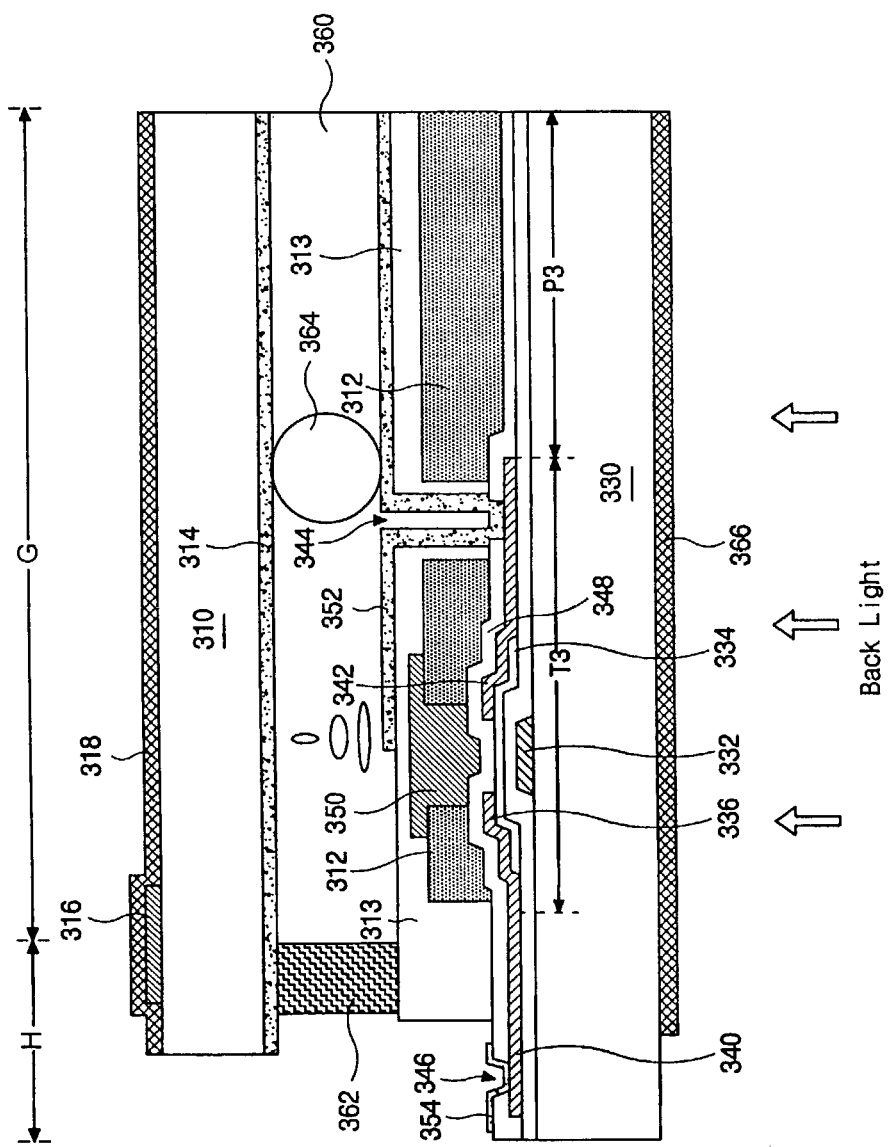
FIG. 6 is a cross-sectional view of another exemplary liquid crystal display device according to the present invention.

FIG. 6 is a cross-sectional view of another exemplary liquid crystal display device according to the present invention. In FIG. 6, a LCD device may include first and second substrates 330 and 310 facing each other with a predetermined space therebetween. A liquid crystal material layer 360 may be interposed between the first and second substrates 330 and 310. The LCD device may have an image area G in which images are to be displayed and a non-image area H around the image area G.

A thin film transistor T3, which may include a gate electrode 332, an active layer 334, and source and drain electrodes 336 and 342, may be formed on an inner surface of the first substrate 330 within the image area G. A data pad 340 may also be formed over the inner surface of the first substrate 330 within the non-image area H, and may connect to the source electrode 336. In addition, a passivation layer 348 may be formed on the thin film transistor T3 and the data pad 340. The passivation layer 348 may have a data pad contact hole 346 exposing the data pad 340.

A color filter layer 312 may be formed on the passivation layer 348 within a pixel region P3 of the image area G. A black matrix 350 may be formed on the passivation layer 348 to cover the thin film transistor T3. A planarization layer 313 may be formed on the color filer layer 312 and the black matrix 350. The planarization layer 313 may flatten the inner surface of the first substrate 330 including the color filter layer 312. The planarization layer 313 may have a drain contact hole 344 exposing the drain electrode 342 through the color filter layer 312 and passivation layer 348.

In addition, a pixel electrode 352 may be formed on the planarization layer 313 within the pixel region P3. The pixel electrode 352 may be connected to the drain electrode 342 through the drain electrode 342. A data pad terminal 354 made of the same material as the pixel electrode 352 may be formed on the passivation layer 348 within the non-image area H. The data pad terminal 352 may be connected to the data pad 340 through the data pad contact hole 346.

Furthermore, a common electrode 314 may be formed on an inner surface of the second substrate 310, and may extend into the non-image area H to form an electrical connection over the first substrate 330 using silver (Ag) dots. First and second alignment layers (not shown) may additionally be formed on the pixel electrode 352 and the common electrode 314, respectively, to arrange liquid crystal molecules of the liquid crystal material layer 360.

A spacer 364 may be formed in the liquid crystal material layer 360 to maintain a uniform cell gap to form a uniform thickness of the liquid crystal material layer 360. Also, a seal pattern 362 may be formed within the non-image area H between the first and second substrates 330 and 310 to prevent the liquid crystal material of the liquid crystal material layer 360 from leaking.

A first polarizer 366 may be arranged on an outer surface of the first substrate 330, and a second polarizer 318 may be arranged on an outer surface of the second substrates 310. The second polarizer 318 may have a light transmissive axis perpendicular to that of the first polarizer 366.

A blocking layer 316 may be formed between the second substrate 310 and the second polarizer 318, and disposed along a border region between the image area G and the non-image area H covering the seal pattern 362. The blocking layer 316 may be formed by a printing method or by an attaching method using an adhesive material. A back light unit (not shown) may be located over the first polarizer 366 to function as a light source. Accordingly, the LCD device may have a high aperture ratio. Further, the black matrix 350 may be formed on the first substrate 330 and may have no margin, since the color filter layer 312 may be formed on the inner surface of the first substrate 330. In addition, light leakage does not occur along an edge of the image area G, since the blocking layer 316 may cover the seal pattern 362, thereby blocking light around the seal pattern 362.

It will be apparent to those skilled in the art that various modifications and variations can be made in the liquid crystal display device and the method of fabricating the same of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   first and second substrates facing each other with a predetermined space therebetween;
   a gate line and a data line on the first substrate;
   a thin film transistor formed on the first substrate, the thin film transistor connected to the gate line and the data line;
   a passivation layer formed on the thin film transistor;
   a black matrix formed directly on the passivation layer and in contact with a drain electrode of the thin film transistor, the black matrix covering only the thin film transistor to expose the gate line and the data line;
   a pixel electrode directly on the passivation layer, wherein the pixel electrode contacts the black matrix without an intervening insulating layer;
   a liquid crystal material layer disposed between the first and second substrates;
   a seal pattern formed between the first and second substrates to surround the liquid crystal material layer;
   a blocking layer directly on outer surface of the second substrate to completely cover the seal pattern from light; and
   a first polarizer formed over the outer surface of the second substrate, wherein the first polarizer is disposed on the blocking layer, and the blocking layer is directly in contact with an inner surface of the first polarizer, wherein the first polarizer almost entirely contacts the outer surface of the second substrate except a portion corresponding to the blocking layer, and wherein the blocking layer is between the outer surface of the second substrate and the inner surface of the first polarizer.

2. The device according to claim 1, wherein the blocking layer is formed on the outer surface of the second substrate by the attaching method using an adhesive material.

3. The device according to claim 1, wherein the blocking layer is formed on the inner surface of the first polarizer by the attaching method using an adhesive material.

4. The device according to claim 1, wherein the blocking layer is disposed directly on the first polarizer.

5. The device according to claim 1, further comprising a second polarizer over an outer surface of the first substrate.

6. The device according to claim 1, further comprising a pixel electrode that is electrically connected to the drain electrode of the thin film transistor through the black matrix.

7. The device according to claim 1, further comprising a passivation layer formed on the thin film transistor and having a drain contact hole.

8. The device according to claim 7, wherein the passivation layer has a dielectric constant less than about four.

9. The device according to claim 8, wherein the passivation layer is made of benzocyclobutene (BCB).

10. The device according to claim 1, wherein the black matrix includes chromium (Cr).

11. A liquid crystal display device, comprising:
    a first substrate having a pixel region;
    a gate line and a data line on the first substrate;
    a thin film transistor formed over an inner surface of the first substrate, the thin film transistor connected to the gate line and the data line;
    a passivation layer formed on the thin film transistor;
    a black matrix formed directly on the passivation layer covering only the thin film transistor and in contact with a drain electrode of the thin film transistor, the black matrix exposing the gate line and the data line;
    a pixel electrode formed within in the pixel region directly on the passivation layer and electrically connected to the thin film transistor, wherein the pixel electrode contacts the black matrix without an intervening insulating layer;
    a second substrate facing the inner surface of the first substrate with a predetermined space therebetween;
    a color filter layer formed on an inner surface of the second substrate;
    a common electrode formed on the color filter layer;
    a liquid crystal material layer disposed between the first and second substrates;
    a seal pattern between the first and second substrates to surround the liquid crystal material layer;
    a blocking layer formed on an outer surface of the second substrate to completely cover the seal pattern; and
    a first polarizer formed over the outer surface of the second substrate, wherein the first polarizer is disposed on the blocking layer, and the blocking layer is formed directly on an inner surface of the first polarizer, wherein the first polarizer almost entirely contacts the outer surface of the second substrate except a portion corresponding to the blocking layer, and wherein the blocking layer is formed on one of the outer surface of the second substrate and the inner surface of the first polarizer by an attaching method.

12. The device according to claim 11, wherein the passivation layer has a dielectric constant less than about four.

13. The device according to claim 12, wherein the passivation layer is made of benzocyclobutene (BCB).

14. The device according to claim 11, wherein the black matrix directly contacts the drain electrode of the thin film transistor.

15. The device according to claim 14, wherein the black matrix includes chromium (Cr).

16. The device according to claim 15, wherein the black matrix is connected to the pixel electrode.

* * * * *